(12) United States Patent
Smith et al.

(10) Patent No.: US 12,187,539 B1
(45) Date of Patent: Jan. 7, 2025

(54) GROUP SHOPPING

(71) Applicant: Amazon Technologies, Inc., Seattle, WA (US)

(72) Inventors: Korwin Jon Smith, Seattle, WA (US); Amber Autrey Taylor, Seattle, WA (US); Alexander Michael McNamara, Seattle, WA (US); Sridhar Boyapati, Sammamish, WA (US); Jason Michael Famularo, Seattle, WA (US); Thomas Meilandt Mathiesen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/310,210

(22) Filed: May 1, 2023

Related U.S. Application Data

(63) Continuation of application No. 17/010,381, filed on Sep. 2, 2020, now Pat. No. 11,639,265, which is a continuation of application No. 14/479,942, filed on Sep. 8, 2014, now Pat. No. 10,769,579.

(51) Int. Cl.
| | |
|---|---|
| *B65G 1/137* | (2006.01) |
| *G05B 15/02* | (2006.01) |
| *G06K 17/00* | (2006.01) |
| *G06Q 10/087* | (2023.01) |

(52) U.S. Cl.
CPC ......... *B65G 1/1373* (2013.01); *B65G 1/1371* (2013.01); *G05B 15/02* (2013.01); *G06K 17/0022* (2013.01); *G06Q 10/087* (2013.01)

(58) Field of Classification Search
CPC .... B65G 1/1373; B65G 1/1371; G05B 15/02; G06K 17/0022; G06Q 10/087
See application file for complete search history.

(56) References Cited

U.S. PATENT DOCUMENTS

| | | | |
|---|---|---|---|
| 5,320,210 A | 6/1994 | Bergh et al. | |
| 6,289,260 B1 | 9/2001 | Bradley et al. | |
| 6,601,763 B1 | 8/2003 | Hoch et al. | |
| 6,876,902 B2 | 4/2005 | Nikolich | |
| 7,010,389 B2 | 3/2006 | Lunak et al. | |
| 7,110,855 B2 | 9/2006 | Leishman | |
| 7,136,721 B2 | 11/2006 | Sano et al. | |
| 7,225,980 B2 | 6/2007 | Ku et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Thomas Randazzo
(74) *Attorney, Agent, or Firm* — Athorus, PLLC

(57) ABSTRACT

This disclosure describes a system for associating multiple totes with a single profile so that items placed into any of the multiple totes are identified on a profile item identifier list. For example, if two users located in a materials handling facility are picking items that are to be consolidated or otherwise treated together, each user may select a different tote and move separately through the materials handling facility. As either user picks items and places those items into a corresponding tote, a profile item identifier list is updated to include an item identifier for each picked item.

20 Claims, 11 Drawing Sheets

(56) References Cited

U.S. PATENT DOCUMENTS

| | | | |
|---|---|---|---|
| 7,468,650 | B2 | 12/2008 | Childress et al. |
| 7,686,171 | B1 | 3/2010 | Shakes et al. |
| 7,751,928 | B1 | 7/2010 | Antony et al. |
| 7,941,244 | B2 | 5/2011 | Somin et al. |
| 7,949,568 | B2 | 5/2011 | Fano et al. |
| 8,009,864 | B2 | 8/2011 | Linaker et al. |
| 8,032,249 | B1 | 10/2011 | Shakes et al. |
| 8,175,925 | B1 | 5/2012 | Rouaix |
| 8,189,855 | B2 | 5/2012 | Opalach et al. |
| 8,311,902 | B2 | 11/2012 | Mountz et al. |
| 8,423,431 | B1 | 4/2013 | Rouaix et al. |
| 8,571,702 | B1 | 10/2013 | Haake et al. |
| 8,630,924 | B2 | 1/2014 | Groenevelt et al. |
| 8,688,598 | B1 | 4/2014 | Shakes et al. |
| 8,718,814 | B1 | 5/2014 | Clark et al. |
| 8,731,708 | B2 | 5/2014 | Shakes et al. |
| 8,798,784 | B1 | 8/2014 | Clark et al. |
| 8,812,147 | B2 | 8/2014 | Keller et al. |
| 8,952,284 | B1 | 2/2015 | Wong et al. |
| 8,972,043 | B2 | 3/2015 | Foster et al. |
| 9,026,243 | B2 | 5/2015 | Radwallner et al. |
| 9,189,769 | B2 | 11/2015 | Caputo et al. |
| 9,245,291 | B1 * | 1/2016 | Ballaro ............... G06Q 30/0635 |
| 9,473,747 | B2 | 10/2016 | Kobres et al. |
| 9,598,234 | B1 | 3/2017 | Criddle et al. |
| 10,163,149 | B1 * | 12/2018 | Famularo ............ G06Q 10/087 |
| 10,176,456 | B2 * | 1/2019 | Puerini ................. G06V 20/52 |
| 10,242,393 | B1 * | 3/2019 | Kumar ............... G06Q 30/0633 |
| 10,322,881 | B1 * | 6/2019 | Manyam ............... G06Q 10/08 |
| 10,339,493 | B1 * | 7/2019 | Famularo ............ G06V 40/197 |
| 10,769,579 | B1 * | 9/2020 | Smith ................. B65G 1/1375 |
| 11,639,265 | B1 * | 5/2023 | Smith ................. B65G 1/1375 |
| | | | 700/216 |
| 2001/0018671 | A1 | 8/2001 | Ogasawara |
| 2003/0002712 | A1 | 1/2003 | Steenburgh et al. |
| 2004/0181467 | A1 | 9/2004 | Raiyani et al. |
| 2005/0043850 | A1 | 2/2005 | Stevens et al. |
| 2005/0149226 | A1 | 7/2005 | Stevens et al. |
| 2005/0216119 | A1 | 9/2005 | Hamilton |
| 2006/0206235 | A1 * | 9/2006 | Shakes ................. B65G 1/1378 |
| | | | 700/216 |
| 2008/0001748 | A1 | 1/2008 | Childress et al. |
| 2008/0055087 | A1 | 3/2008 | Horii et al. |
| 2008/0077511 | A1 | 3/2008 | Zimmerman |
| 2008/0109114 | A1 | 5/2008 | Orita et al. |
| 2009/0121017 | A1 | 5/2009 | Cato et al. |
| 2009/0245573 | A1 | 10/2009 | Saptharishi et al. |
| 2009/0248549 | A1 | 10/2009 | Breslau et al. |
| 2011/0011936 | A1 | 1/2011 | Morandi et al. |
| 2012/0029685 | A1 | 2/2012 | Keller et al. |
| 2012/0284132 | A1 | 11/2012 | Kim et al. |
| 2013/0076898 | A1 | 3/2013 | Philippe et al. |
| 2013/0253700 | A1 | 9/2013 | Carson et al. |
| 2013/0262276 | A1 | 10/2013 | Wan et al. |
| 2013/0310967 | A1 | 11/2013 | Olson et al. |
| 2014/0214195 | A1 | 7/2014 | Worsley |
| 2014/0244429 | A1 | 8/2014 | Clayton et al. |
| 2014/0244447 | A1 | 8/2014 | Kim et al. |
| 2014/0244488 | A1 | 8/2014 | Kim et al. |
| 2014/0257553 | A1 | 9/2014 | Shakes et al. |
| 2014/0279294 | A1 | 9/2014 | Field-Darragh et al. |
| 2014/0279659 | A1 | 9/2014 | Seay |
| 2014/0350715 | A1 * | 11/2014 | Gopalakrishnan ... G06Q 10/087 |
| | | | 700/215 |
| 2014/0362223 | A1 | 12/2014 | LaCroix et al. |
| 2015/0019391 | A1 | 1/2015 | Kumar et al. |
| 2015/0073907 | A1 | 3/2015 | Purves et al. |
| 2015/0081088 | A1 | 3/2015 | Lyon et al. |
| 2015/0339622 | A1 | 11/2015 | MacDonald et al. |
| 2017/0076251 | A1 | 3/2017 | Simske et al. |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

GROUP SHOPPING

PRIORITY CLAIM

This application is a Continuation of U.S. patent application Ser. No. 17/010,381, filed Sep. 2, 2020, and titled "Tote and Item Association," which is a Continuation of U.S. Pat. No. 10,769,579, filed Sep. 8, 2014, issued Sep. 8, 2020, and titled "Tote Association," the contents of each of which are herein incorporated by referenced in their entirety.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can pick items from inventory and take them to a cashier for purchase, rental, etc. Many of those physical stores also maintain inventory in a storage area, or fulfillment centers, that can be used to replenish inventory located in the shopping area and/or to satisfy orders for items that are placed through other channels (e.g., e-commerce). Other examples of entities that maintain inventory include libraries, museums, rental centers, and the like.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
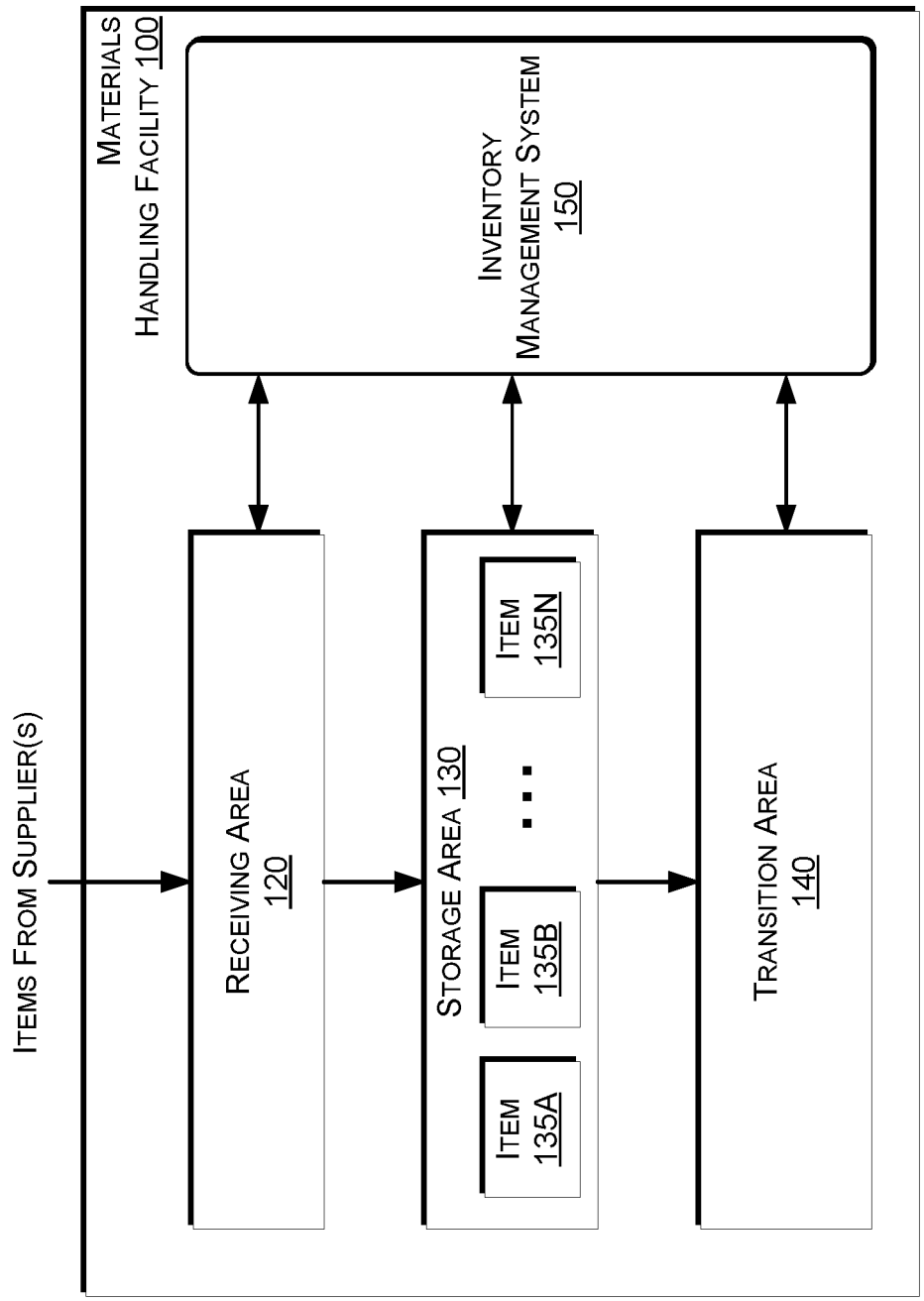
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system for associating or consolidating multiple totes with a single profile, such as a user profile. For example, an agent (also referred to herein as user) may pick items from inventory locations and place those items into a tote. If the tote becomes full, the user may select a second tote and continue picking items and placing those items into the second tote. The items in both the second tote and the first tote may be associated with the user and presented to the user in a profile item identifier list. The profile item identifier list may identify all items associated with the user, the user's profile and/or totes associated with the user.

In other implementations, multiple users may be picking items that are to be consolidated or otherwise treated together. For example, an order for multiple items may be received and assigned to two different users for picking. Each of the two users may select a different tote for use in placing items as they are picked. The selected totes are associated with a single profile and, as each user picks items and places those items into a respective tote, a profile item identifier list is updated to include an item identifier representative of the items placed into the two totes. The profile item identifier list may also be presented to each of the users to identify the total items picked by both users. Likewise, a user may view a tote item identifier list identifying just the items in the tote associated with that user.

A user may pick an item from an inventory location and place the item into a tote. The systems described herein detect the item when it is placed into the tote. Likewise, when an item is removed from the tote, the removal of that item is detected.

In some implementations, the tote may include an item identifier reader, such as a radio frequency identifier ("RFID") reader, and a receiving component, such as one or more antennas that read an item identifier (e.g., RFID) when the item is placed in and/or removed from the tote. The item identifier reader and receiving component may be part of the tote and in communication with a processor that adds or removes item identifiers from a tote identification list as the items are added or removed from the tote.

In other implementations, the tote may include one or more image capture devices (e.g., cameras) that capture images of items as they are placed into or removed from the tote. The images may be processed, for example, using an object detection algorithm, image matching algorithm, optical character recognition algorithm, etc., to determine the item that has been placed into the tote or picked from the tote.

As an item is added to a tote and/or removed from the tote, an item identifier representative of the item may be added to a profile item identifier list and/or a tote item identifier list. A profile item identifier list identifies all items currently located in totes associated with a profile. For example, if there are multiple totes associated with a single profile, and each tote includes one or more items, all items included in the multiple totes are identified in the profile item identifier list. Likewise, a tote item identifier list may be maintained for each tote that identifies the items included in that respective tote.

The profile item identifier list and/or the tote item identifier list may be provided to a user for display. For example, while the user is located in the materials handling facility, they may be able to view the profile item identifier list and/or the tote item identifier list. In one implementation, a tote may include an output device (e.g., display) that is configured to present to the user the profile item identifier list and/or the tote item identifier list.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and transition areas 140 may be interspersed rather than segregated. Additionally, the materials handling facility 100 includes an inventory management system 150 configured to interact with each of receiving area 120, storage area 130 and transition area 140.

The materials handling facility 100 may be configured to receive different kinds of inventory items 135 from various suppliers and to store them until a customer orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135, such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, or as a user progresses through the materials handling facility 100, the corresponding items 135 may be selected or "picked" from storage area 130. In various implementations, item picking may range from manual to completely automated picking. For example, in one implementation, a user may have a list of items they desire and may progress through the materials handling facility picking items 135 from the storage area 130 and placing those items 135 into a tote. In other implementations, materials handling facility employees may pick items 135 using written or electronic pick lists derived from customer orders and place picked items into a tote as the materials handling facility agent progresses through the materials handling facility 100.

As discussed in more detail below, as items are picked and placed in a tote, the tote may be configured to identify the items placed in the tote and manage a tote item identifier list that includes an identifier of each item. After items 135 have been picked and placed in a tote, they may be processed at transition area 140. A transition area may be any designated area within a materials handling facility where items included in the tote are transitioned from one location to another, or from one entity to another. For example, the transition area may be a packing station within the materials handling and, when the tote arrives at the packing station (transition area), the items may be transitioned from the storage area 130 to the packing station. Such information may be maintained by the inventory management system 150 to enable accurate tracking of items. In another example, if the items are departing the materials handling facility (e.g., a carrier is taking the items for transport, a customer is purchasing or renting the items), when the tote reaches the transition area, the tote item identifier list is obtained and the items are transitioned from the materials handling facility to the new entity (e.g., carrier, customer).

Figure 2:
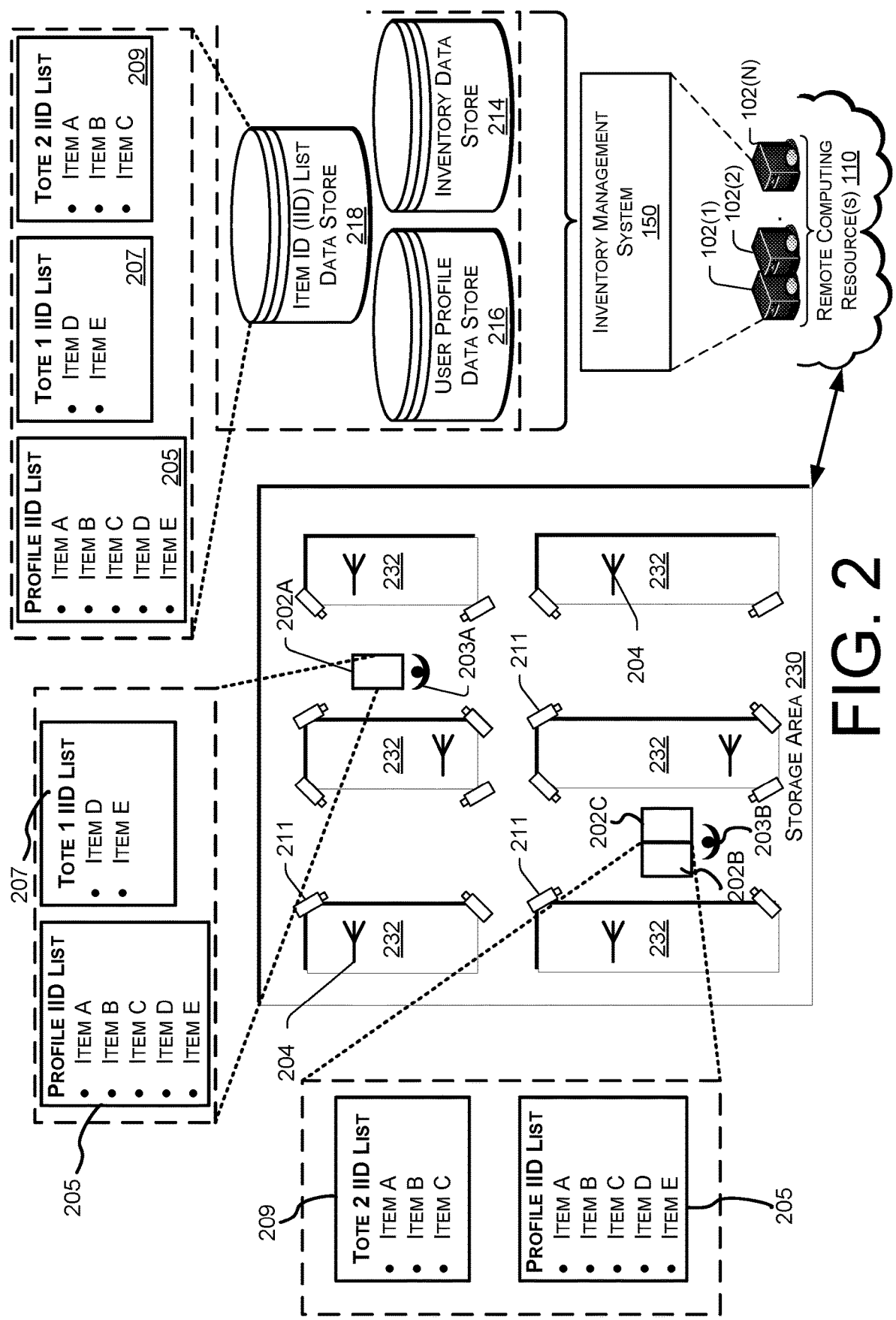
FIG. 2 is a block diagram illustrating additional details of a materials handling facility, according to some implementations.

To further illustrate, FIG. 2 is a block diagram of additional details of a storage area 230 within a materials handling facility, according to some implementations. A materials handling facility agent, customer, or other individual (generally referred to herein as a user) may select and utilize one or more totes 202 to progress through a materials handling facility 100 to pick items from inventory locations 232. In this example, there are two associated users 203A and 203B that are picking items into different totes. For example, the two users 203A, 203B may identify that they are picking items for a same profile or a same pick list. When each user 203 picks a tote, the tote is determined and associated with a profile (also referred to herein as a primary profile). Multiple users and/or multiple totes may be associated with the same profile and items added/removed from a tote may be added/removed from a profile item identifier list.

In this example, the first user 203A has selected a first tote 202A, and the second user 203B has selected a second tote 202B and a third tote 202C. The second tote 202B and the third tote 202C are coupled together (discussed below). Both users 203 and all three totes are associated with a single profile and a profile item identifier list 205 is established that will identify all items included in any of the three totes 202A-202C or picked by either of the users 203A, 203B. Likewise, a first tote item identifier list 207 may be established that is configured to identify all items located in the first tote 202A. A second tote item identifier list 209 may also be established that is configured to identify all items included in either of second tote 202B or the third tote 202C. The profile item identifier list and/or the tote item identifier list(s) may be maintained by the tote(s) and/or maintained by the inventory management system 150. For example, a tote may detect an item located in the tote, provide item information to the inventory management system 150 and the inventory management system may update the profile item identifier list 205 and corresponding tote item identifier list 207. The profile item identifier list and tote item identifier list(s) may be maintained by the inventory management system 150 in an item identifier list data store 218 and sent to output devices for display or presentation to the user.

As items are picked and placed into the tote, an item identifier (e.g., RFID) located on the item is detected and added to a profile item identifier list that identifies the items included in the tote 202. In some implementations, as discussed further below, the tote 202 may include an item identifier reader, such as an RFID reader, and a receiving component, such as one or more antennas that periodically or continuously scan the inside of the tote for item identifiers. Generally, the item identifier reader and/or the receiving component may utilize one or more wireless technologies (e.g., RFID, near field communication ("NFC"), Bluetooth, infrared) to detect item identifiers. When an item identifier is detected, a processor located on the tote 202 may receive the item identifier and record the item identifier in the tote item identifier list and/or the profile item identifier list which is maintained in a memory located on the tote 202 or maintained by the inventory management system 150. Example implementations of the tote 202 are provided below in more detail with reference to FIGS. 3A-5. In other implementations, one or more input components, such as cameras 211, may capture images of items as they are picked by the user from an inventory location 232 and/or as the items are placed into a tote 202. The images may be processed to identify the item and a corresponding item identifier may be added to the profile item identifier list and/or the tote item identifier list. For example, one or more algorithms, such as an edge detection algorithm, grey scale processing algorithm, object detection algorithm, optical character recognition algorithm, etc., may be used to process and identify the item represented in the image.

In still other implementations, the shelves of the inventory locations 232 may include one or more sensors (e.g., scales, load cells, weight sensors) that detect a change in a weight at the shelf. When a weight decrease is detected, it may be determined that an item has been picked from the inventory location. Location information may be provided to the inventory management system 150 and the item corresponding to the location of the weight change may be determined based on the information maintained in the inventory data store 214.

In some instances, the tote 202 may operate in conjunction with or may otherwise utilize or communicate with one or more components of the inventory management system 150. Likewise, components of the inventory management system 150 may interact and communicate with the tote 202 as well as identify the user(s) that is utilizing the tote 202 and/or communicate with other components of the materials handling facility 100.

Generally, the inventory management system 150 may include one or more communication devices, such as wireless antennas 204, that facilitate wireless communication (e.g., Wi-Fi, NFC, Bluetooth) between the inventory management system 150 and the tote 202. The inventory management system 150 may also include one or more server systems 102 that may be local to the materials handling facility 100, remote from the materials handling facility 100, or any combination thereof.

The inventory management system 150 may utilize antennas 204 within the materials handling facility 100 to create a local wireless network (e.g., Wi-Fi) so that the tote 202 can connect to and communicate with the inventory management system 150 and/or other totes 202. Likewise, in instances when one or more of the components of the inventory management system 150 are remote from the materials handling facility 100, they may communicate with other components of the inventory management system 150 and/or the tote 202 via a network.

In some implementations, the tote 202 may be provided to the user (e.g., materials handling facility agent) when the user arrives at the materials handling facility 100. In such an instance, the user may identify themself to the inventory management system 150 and the tote 202 may be associated with the user and/or user's profile by associating a unique identifier of the tote 202 with the identified user/user account. Likewise, the user may pick multiple totes, all of which may be associated with the user's profile. In some implementations, multiple totes may be selected when the user arrives at the materials handling and the totes optionally connected or coupled together. In other implementations, a user may select additional totes while in the materials handling facility. For example, a user may fill a first tote and select a second tote. Both totes may be associated with the same profile and items included in either tote identified on a single profile item identifier list.

In still other implementations, multiple users may be associated with the same profile such that items picked by those users may be added to the same profile item identifier list. For example, a first user and a second user may both arrive, the first user may identify themselves to the inventory management system 150 and identify that the second user is to be associated with the profile of the first user. This may be a permanent association or an association for a defined period (e.g., during the visit to the materials handling facility).

In still another implementation, two or more totes may be associated with the same profile at different times. For example, a first tote may be associated with a first user located in the materials handling facility and a second tote associated with a second user located in the materials handling facility. While in the materials handling facility, the two users may select to connect or combine their totes. In such an example, items identified on the tote item identifier list for one of the totes (e.g., the second tote) may be combined with a profile associated with the other tote (e.g., the first tote) and a profile item identifier list updated to include item identifiers for items contained in either tote.

When the user leaves the tote(s) 202, such as at the end of a work day, the association between the tote 202 and the user may be removed so that the tote 202 can be reissued to another user when he/she arrives at the materials handling facility 100.

The following is an example use case that includes two users 203A, 203B and three totes 202A, 202B, 202C. In this example, both users 203A, 203B are materials handling facility employees (e.g., picking agent) that have badges or other identifiers that can be used to identify the users.

The two users are identified and designated to pick items that are to be consolidated or otherwise treated together. Both users are associated with a profile, such as user A's profile. Each user 203A, 203B may be identified by the inventory management system 150 via a wireless network and an antenna 204 accessible within the materials handling facility 100. When the first user 203A selects a tote 202A, the tote 202A is identified by the inventory management system 150 and a unique identifier representative of the tote 202 is associated with the profile and the first user 203A. Likewise, when the second user 203B selects a tote 202B, the tote 202B is identified by the inventory management system 150 and a unique identifier representative of the second tote 202B is associated with the same profile and associated with the second user 203B. In this example, the second user 203B has also picked a third tote 202C. The third tote 202C is identified and a unique identifier representative of the second tote is associated with the profile and the second user 203B. Likewise, the third tote 202C is associated with the second tote 202B. In this example, the totes may be physically coupled together and the second tote 202B becomes a master tote and the third tote 202C becomes a slave tote. As items are added to either tote 202B, 202C, the information is provided to the second tote 202B and the second tote provides the information to the inventory management system 150.

In addition to maintaining a profile item identifier list, tote item identifier lists may also be maintained by the inventory management system and/or by the totes. For example, a first tote item identifier list 207 is maintained by both the first tote 202A and the inventory management system 150. The first user 203A, in this example, has picked two items, Item D and Item E and placed those items into the tote 202A. The item identifiers are added to the first tote item identifier list 207 and the profile item identifier list 205. For example, the first tote 202A may update the first tote item identifier list 207 and provide the added item information to the inventory management system 150. The inventory management system 150 may update the first tote item identifier list 207 maintained by the inventory management system and update the profile item identifier list 205. Upon updating the profile item identifier list 205, the inventory management system 150 may send for display the profile item identifier list. The profile item identifier list may be sent for display on any output device, such as a user's output device, a portable device, a device coupled to the tote, an output device located in the materials handling facility, etc.

The second user 203B has picked three items, Item A, Item B, Item C and placed those items in either tote 202B or 202C. Upon detection of the items, the items are identified and the second tote item identifier list 209 is updated by the second tote 202B and/or by the inventory management system 150. Likewise, the profile item identifier list 205 is updated to include the items located in the second tote 202B and the third tote 202C. The updated profile item identifier list 205 is then sent for display. For example, the updated profile item identifier list 205 may be sent by the inventory management system 150 to the first tote 202A for display to the first user 203A.

Each time an item is added to a tote associated with the profile or removed from a tote associated with the profile, the profile item identifier list is updated to reflect the addition/removal and that updated profile item identifier list may be provided to each of the corresponding totes and/or users associated with the profile. By maintaining a single profile item identifier list for multiple totes and/or users, a complete list of all items included in the totes associated with the profile is maintained and may be presented to the user. Likewise, by maintaining a tote item identifier list, a list of all items included in the respective tote or group of connected totes may be presented to a user.

It will be appreciated that any number of analysis techniques may be utilized to assist in confirming that the items included in a tote 202 correspond to those identified in a tote item identifier list and/or profile item identifier list, and the ones illustrated herein are provided only as examples.

As discussed above, the tote 202 may communicate with the inventory management system 150 over a variety of communication paths. Generally, the inventory management system 150 may include any number and combination of input components, output components and server system 102. The input components may include imaging devices, microphones, antennas 204, or any other component that is capable of receiving input about the surrounding environment, from the tote 202 and/or from users. The output components may include projectors, displays, antennas 204, speakers and/or any other component that is capable of providing output to its surrounding environment, the tote and/or users.

The inventory management system 150 may also include a server system 102. The server system 102 may be local to the materials handling facility, remote from the materials handling facility, or any combination thereof. Likewise, the server system 102 may be configured to communicate over a network with the input components, output components and/or directly with the tote 202.

As illustrated, the inventory management system 150 is implemented on remote computing resources 110, which may include one or more servers 102(1), 102(2), . . . , 102(N) and may, in some instances, form a portion of a network-accessible computing platform implemented as a computing infrastructure of processors, storage, software, data access, and so forth that is maintained and accessible by components/devices of the inventory management system 150 and/or the tote 202 via a network, such as the Internet. The server system 102 does not require end-user knowledge of the physical location and configuration of the system that delivers the services. Common expressions associated for the remote server system 102 include "on-demand computing," "software as a service (SaaS)," "platform computing," "network-accessible platform," "cloud services," "data centers," and so forth.

The network (not shown) may utilize wired technologies (e.g., wires, USB, fiber optic cable, etc.), wireless technologies (e.g., RF, IR, NFC, cellular, satellite, Bluetooth, etc.), or other connection technologies. The network is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The server system 102 may also include an inventory data store 214, a user profile data store 216, and an item identifier list data store 218. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The inventory data store 214 maintains information about items 135 stored in the storage areas 130 of the materials handling facility 100. For example, the inventory data store 214 may store for each item, the item's weight, dimensions, color, expiration date, volume, manufacturer, identifier (e.g., universal product identifier), quantity of items in the storage area, description of the item, location within the materials handling facility, etc.

The user profile data store 216 includes information about users, such as materials handling facility employees, customers, etc. Any type of information may be stored in the user profile data store 216. For example, user profile information, such as attributes, name, address, gender, purchase history, social networks, user associations, and/or friends with which the user interacts, and the like may be stored in the user profile data store 216. User profile information may be provided directly by users, such as when they become employed, collected from users when interacting with the inventory management system 150 and/or totes 202, etc.

The item identifier list data store 218 may include tote item identifier lists for each tote or connected group of totes within the materials handling facility 100 and/or profile item identifier lists. Likewise, the item identifier list data store 218 may include information about each tote, such as the unique identifier, the weight of the tote, dimensions of the tote, etc.

The inventory data store 214, user profile data store 216, and item identifier list data store 218 may be integrated with the server system 102 or otherwise communicatively coupled with the server system 102. For example, one or more of the inventory data store 214, user profile data store 216, and item identifier list data store 218 may be located at a remote computing resource 110 and communicatively coupled with the server system 102. In some implementations, the inventory data store 214, user profile data store 216, and item identifier list data store 218 may include one or more CD-RW/DVD-RW drives, hard disk drives, solid-state drives, tape drives, or other storage devices that are utilized to store digital content and information. The server system 102, separately or together with the inventory data store 214, user profile data store 216 and item identifier list data store 218 may provide an inventory management system 150.

The organization and operation of the materials handling facility 100 described above is given as an example. In other implementations, a materials handling facility 100 may be arranged differently and operate differently than described above. For example, some implementations of materials handling facility 100 may not have a dedicated receiving area 120. In such implementations, received items may be placed directly into the storage area 130. In general, the materials handling facility 100 may employ any organization and operational flow for handling inventory.

Figure 3B:
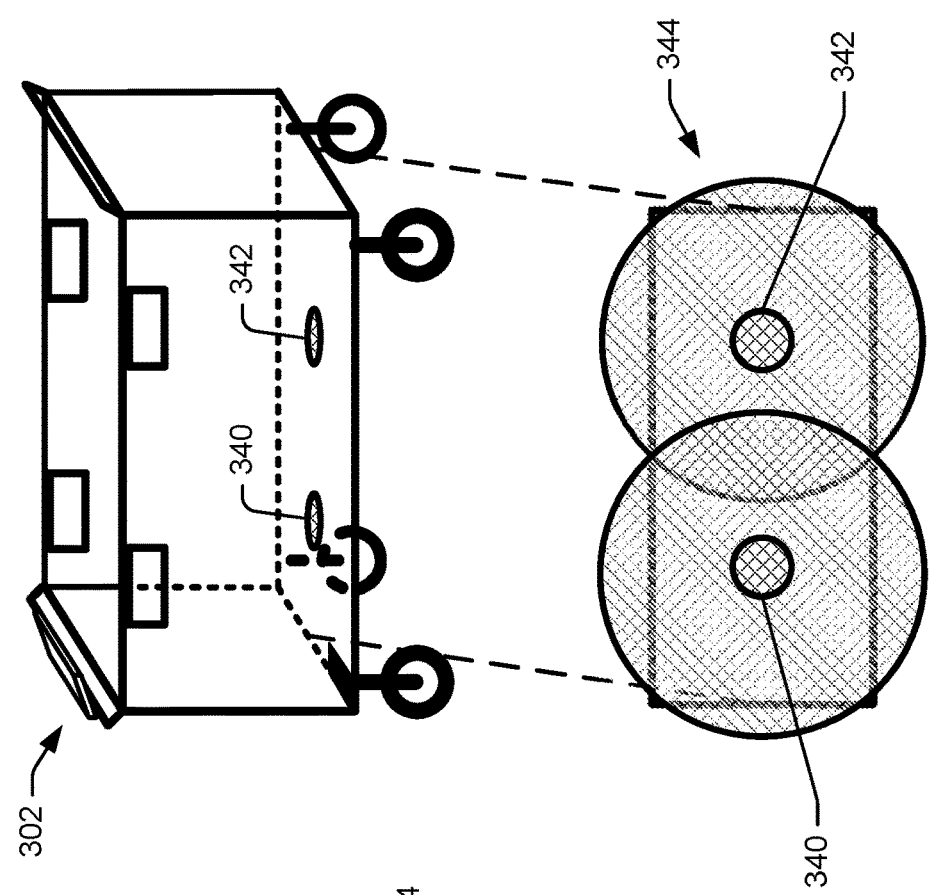
FIGS. 3A, 3B, 4, and 5 illustrate example tote configurations, according to some implementations.
Figure 3A:
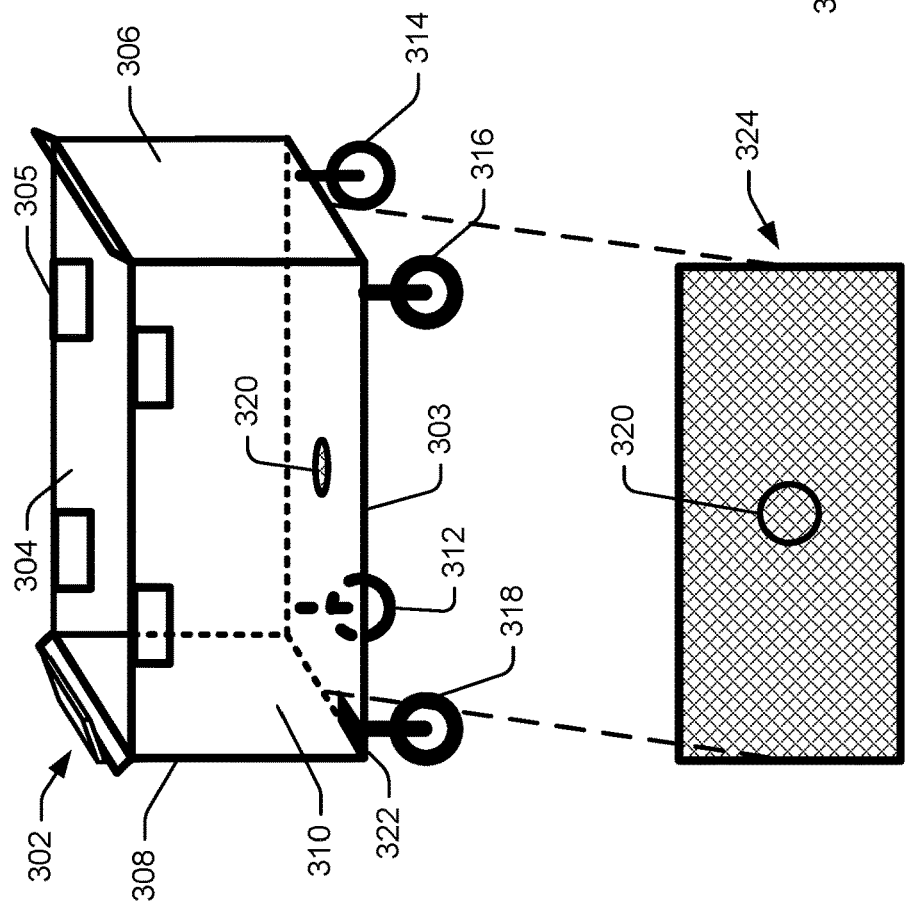

FIGS. 3A, 3B, 4, 5 illustrate example tote configurations, according to some implementations. Turning first to FIG. 3A, the tote 302 may include a base surface 303 and a plurality of side surfaces 304, 306, 308, 310 coupled to the base surface 303 and positioned to define a cavity into which items may be placed. In the examples described herein, the totes have four side surfaces 304-310 that are coupled to the base surface 303 to form a cavity having a cube shape. In other implementations, different configurations, numbers and shapes of the base surface 303 and side surfaces 304-310 may be utilized to form any variety, shapes and sizes of cavities. Likewise, the surfaces and/or base of the tote may be of any type of material and have any type of shape, texture and/or size. For example, the surfaces and/or base may be steel, mesh, plastic, metal, aluminum, etc. In some implementations, one or more of the surfaces and/or base may be of different materials. Generally, the tote may be any structure into which one or more items may be placed and/or stored. For example, a tote may be a bag, bin, cart, package, box, bowl, etc.

The tote 302 may also include one or more rollers 312, 314, 316, 318 or wheels to assist a user in propelling the tote 302 through a materials handling facility. Likewise, in some implementations, the tote 302 may be motorized to assist in propulsion of the tote 302. In still other implementations, the tote 302 may not include rollers 312-318 but instead may be carried by a user. For example, the tote 302 may be configured with one or more handles that enable the user to carry the tote 302 throughout the materials handling facility.

Regardless of the configuration, the tote 302 may include one or more item identifier readers and receiving components 320. For example, the item identifier reader may be a RFID reader, such as a Motorola FX7400, a Motorola MC3190-Z, a Skyetek Module M10, and the like. Likewise, the antenna may be one or more directional antennas, such as a Laird S9025P antenna.

The tote 302 may also include additional functional components 322, such as a processor, computer-readable media, memory, power, etc. Example functional components 322 of a tote are discussed further below with respect to FIG. 8. The functional components may be in communication with the item identifier reader and receiving component 320 and provide power to the item identifier reader and receiving component 320. When an item identifier is detected by the item identifier reader and receiving component 320, it may be provided to the functional components 322 for additional processing. For example, the functional components may add the detected item identifier to a tote item identifier list and/or a profile item identifier that is maintained in a memory of the functional components 322. In some implementations, the functional components 322 may also provide the tote item identifier list, profile item identifier list, and/or the received item identifiers individually to the inventory management system 150 and/or to other totes.

The item identifier reader and receiving component 320 may be configured to detect the presence of item identifiers located within the cavity of the tote 302, but not detect item identifiers not located in the cavity of the tote 302. For example, if the item identifier is a passive RFID, which receives power from the item identifier reader and receiving component 320, the transmitted power and/or the receiving range of the receiving component 320 may be adjusted such that it will only provide power to item identifiers located within the cavity of the tote 302. For example, the power of the item identifier reader and receiving component 320 may be adjusted such that the radiated power only extends to the edges or sides of the tote 302. However, in some configurations, such as that illustrated in FIG. 3A, if the tote 302 is not round shaped, portions of the radiation pattern will extend beyond the cavity of the tote, which could result in item identifiers not within the cavity of the tote 302 being detected.

To reduce the likelihood of detecting item identifiers not within the cavity of the tote 302, in some implementations, the sides 304-310 of the tote may include a radiation shield, such as aluminum, copper, or any other material that eliminates or reduces radio frequency radiation. The top down view 324 of the tote 302 illustrates the radiation pattern from the item identifier reader and receiving component 320 when a shield is included on the sides of the tote 302. As illustrated, rather than the pattern propagating beyond the cavity of the tote 302, the shield included on the walls of the tote eliminates the radiation beyond the sides of the tote 302 so that item identifiers not located in the cavity of the tote will not be detected.

In other implementations, rather than or in addition to including shields on the sides of the tote, multiple antennas may be used with the item identifier reader. For example, FIG. 3B is a block diagram of a tote 302 with multiple receiving components 340, 342 located on the base surface of the tote 302. By utilizing multiple receiving components positioned within the tote 302, the power radiated from each receiving component can be reduced, yet the radiation pattern will still cover the cavity of the tote and detect item identifiers included in the cavity of the tote. Referring to the top-down view 344 of FIG. 3B, without shielding on the sides of the tote 302, with multiple receiving components 340, 342, the amount of area beyond the tote 302 that is within the radiation of the receiving components 340, 342 is reduced, thereby reducing the likelihood of detecting item identifiers that are not within the cavity of the tote 302. While the example illustrated in FIG. 3B utilizes two receiving components 340, 342, any number of receiving components may be utilized.

In addition to shielding the sides of the tote and/or utilizing multiple antennas, in some implementations, additional techniques may be used to reduce the likelihood of including items on the tote item identifier list that are not in the cavity of the tote 302. For example, the item identifier reader may be configured to only scan for items while the tote 302 is in motion. In such an implementation, the functional components 322 may include an accelerometer, gyroscope, compass and/or other form of motion detection component and instruct the item identifier reader to only scan for item identifiers when the cart is in motion. In such an implementation, the likelihood of detecting an item identifier that is not in the tote 302 as the tote passes by the item identifier is greatly reduced because the item identifier will only potentially be within range of the item identifier reader and receiving component 320 for a brief instance. To further this implementation, it may also be required that an item be detected for a certain period of time (e.g., 5 seconds) before it is considered within the tote cavity.

In still other implementations, it may be required that an item identifier be detected multiple times before it is included in the tote item identifier list. For example, if the item identifier reader and antenna periodically scan for item identifiers, each time an item identifier is detected, a count of the number of detections is maintained. In such an implementation, a predetermined threshold may exist and the item identifier may only be added to the tote item identifier list when the count of the number of times the item identifier has been detected meets or exceeds the predetermined threshold.

As illustrated in FIGS. 3A-3B, each of the totes may also include one or more connection points 305. The connection points are configured to connect or couple two or more totes. Connection of totes is discussed in further detail below with respect to FIGS. 6-7.

Figure 4:
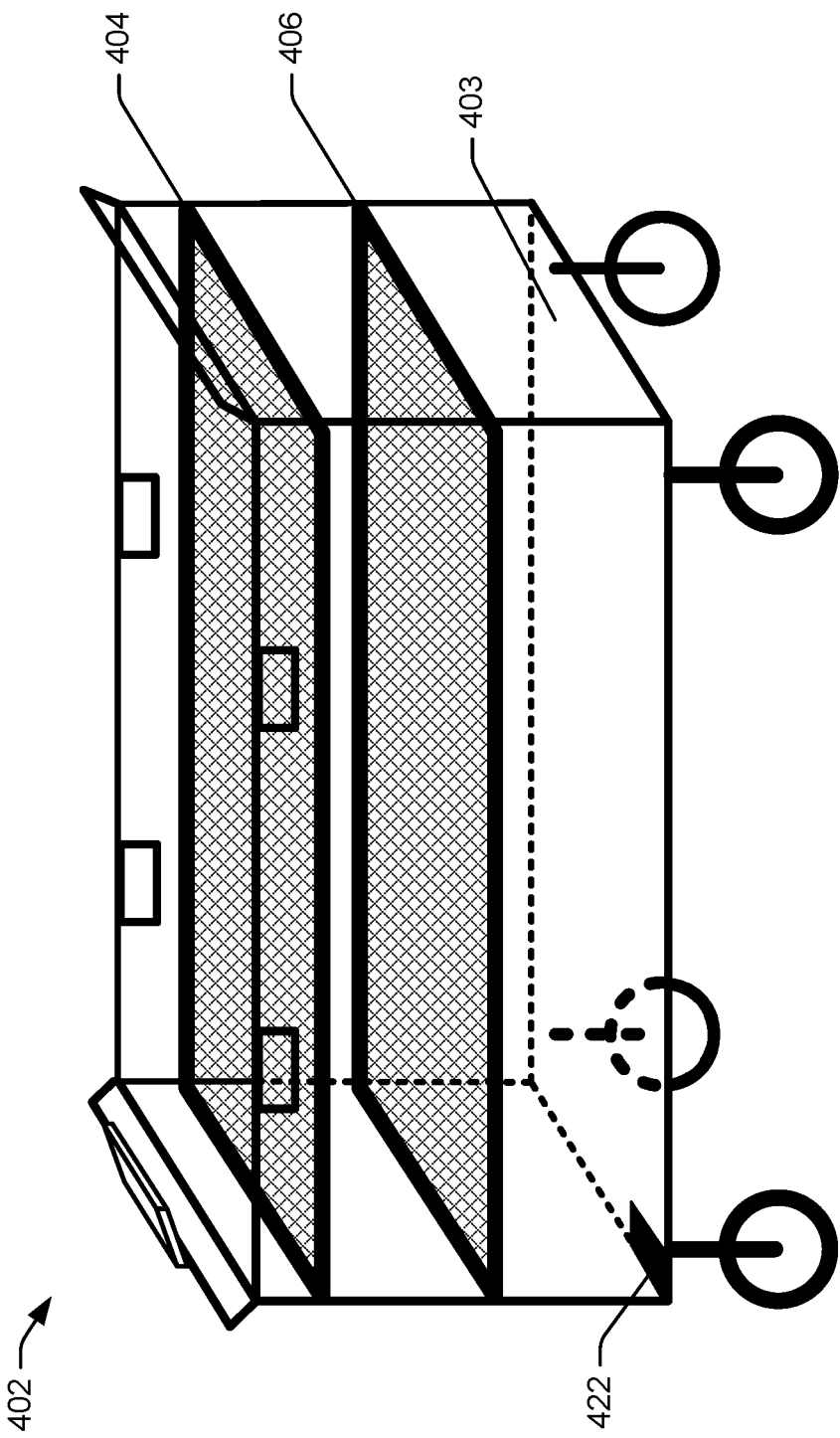

FIG. 4 provides yet another block diagram of a tote 402 that may be used with the various implementations described herein. In this example, the tote 402 may include two receiving components 404, 406. In one implementation, the receiving components may be loop antennas, such as Times-7 Slimline A8060 antennas. The receiving components 404, 406 may be coupled to the sides of the tote such that each antenna's radiation pattern defines a plane within the cavity of the tote 402 that is substantially parallel with the base surface 403 of the tote 402. In one implementation, the upper most, or top receiving component 404, may be positioned at or near the top of the tote 402, and the second receiving component 406 may be positioned at a point separated from the first receiving component and below the first receiving component. For example, the second receiving component 406 may be positioned around the sides of the tote 402 at a half-way point between the top of the tote and the base surface of the tote. In other implementations, the second receiving component 406 may be positioned only a few centimeters from the first receiving component 404. The only limitation in positioning the receiving components 404, 406 is that there is sufficient separation such that a time difference may be determined as to when an item passes through the receiving components.

In the example illustrated in FIG. 4, when an item is placed into or removed from the tote 402, it will pass through each plane of the receiving components 404, 406, thereby activating the receiving components 404, 406. The receiving components 404, 406 detect the item identifier as it passes through the respective planes. When the plane is interrupted and the item identifier detected, such information may be provided to the functional components 422 of the tote. In this example, in addition to providing the detected item identifier, a timestamp may also be provided identifying a time when the item passed through the plane of the receiving components 404, 406. As discussed further below with respect to FIG. 8, based on the timestamps received from each receiving component 404, 406, it may be determined whether the detected item identifier was added to or removed from the tote 402. For example, if the plane of the top receiving component 404 was interrupted before the plane of the lower receiving component 406, it may be determined that an item was added to the tote 402. In comparison, if the plane of the lower receiving component 406 was interrupted before the plane of the top receiving component 404, it may be determined that the item was removed from the tote 402.

Figure 5:
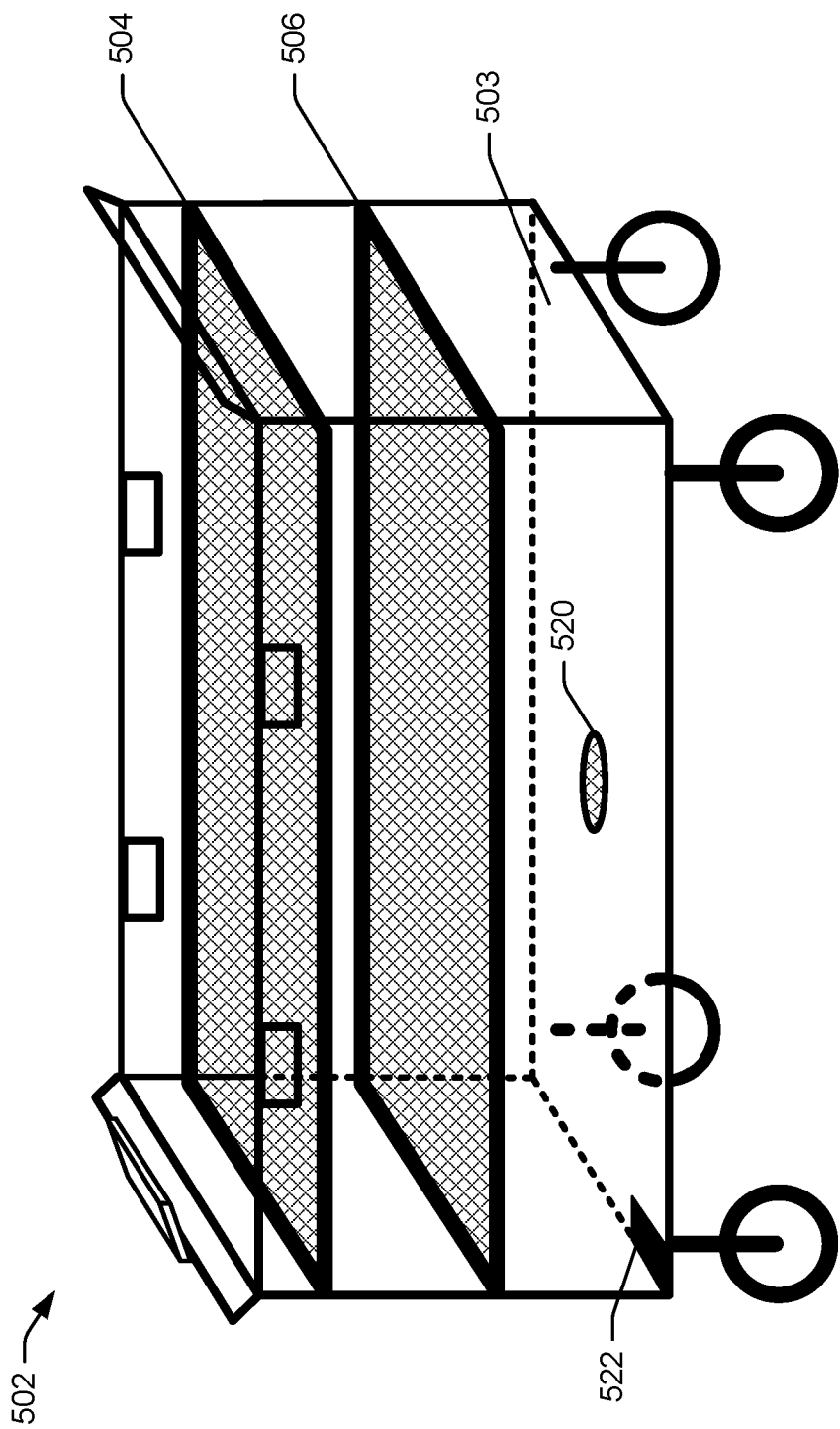

In some implementations, in addition to or as an alternative to using the receiving components to detect the item identifiers, in some implementations the tote 402 may also include a receiving component located on the base surface of the tote that is utilized by the item identifier reader to detect item identifiers, as illustrated in FIG. 5. FIG. 5 is a block diagram of a tote 502 that includes two receiving components 504, 506 positioned around the sides of the tote 502, each defining a plane that is substantially parallel with a base surface 503 of the tote 502. In addition, the tote 502 includes a receiving component 520 that communicates with an item identifier reader included in the functional components 522 of the tote 502. As with the other examples, the item identifier reader, rather than being separate from the receiving components 520, may be included with or include the receiving component 520.

While the examples discussed above refer to the planes of the receiving components being substantially parallel with the base surface of the tote, in other implementations the planes may not be substantially parallel with the base surface of the tote. Generally, the planes may be at any angle with respect to the base surface of the tote and/or each other. The only constraint is that the planes of the receiving components be positioned such that, when an item identifier is added to or removed from the tote, it will pass through at least two planes.

In the example illustrated in FIG. 5, the addition and removal of items may be detected by activation of the planes of the receiving components 504, 506 and the receiving component 520 may be utilized to detect a new item identifier (when an item is added to the tote) or the removal of an item identifier (when an item is removed from the tote). In such an implementation, the receiving components 504, 506 may be any component that is capable of detecting whether an item identifier has passed through its plane and provide information to the functional components 522 identifying a timestamp or other identifier that can be used to determine whether the item identifier passed through the plane of the top receiving component or the lower receiving component first.

The receiving component 520 may communicate with the item identifier reader and operate in a manner similar to that discussed above with respect to FIGS. 3A, 3B to detect the addition and/or removal of item identifiers from the tote 502. Similarly, like the totes described with respect to FIGS. 3A, 3B, the sides of the tote 502 may be shielded and/or multiple receiving components 520 may be positioned within the tote 502. Likewise, additional processes, such as only scanning for item identifiers while the tote 502 is in motion or maintaining a count threshold that must be exceeded before an item is considered added to the tote 502, may also be utilized. In general, the configurations and examples described with respect to FIGS. 3A, 3B, 4, and 5 may be combined and/or used separately with the implementations described herein.

Figure 6:
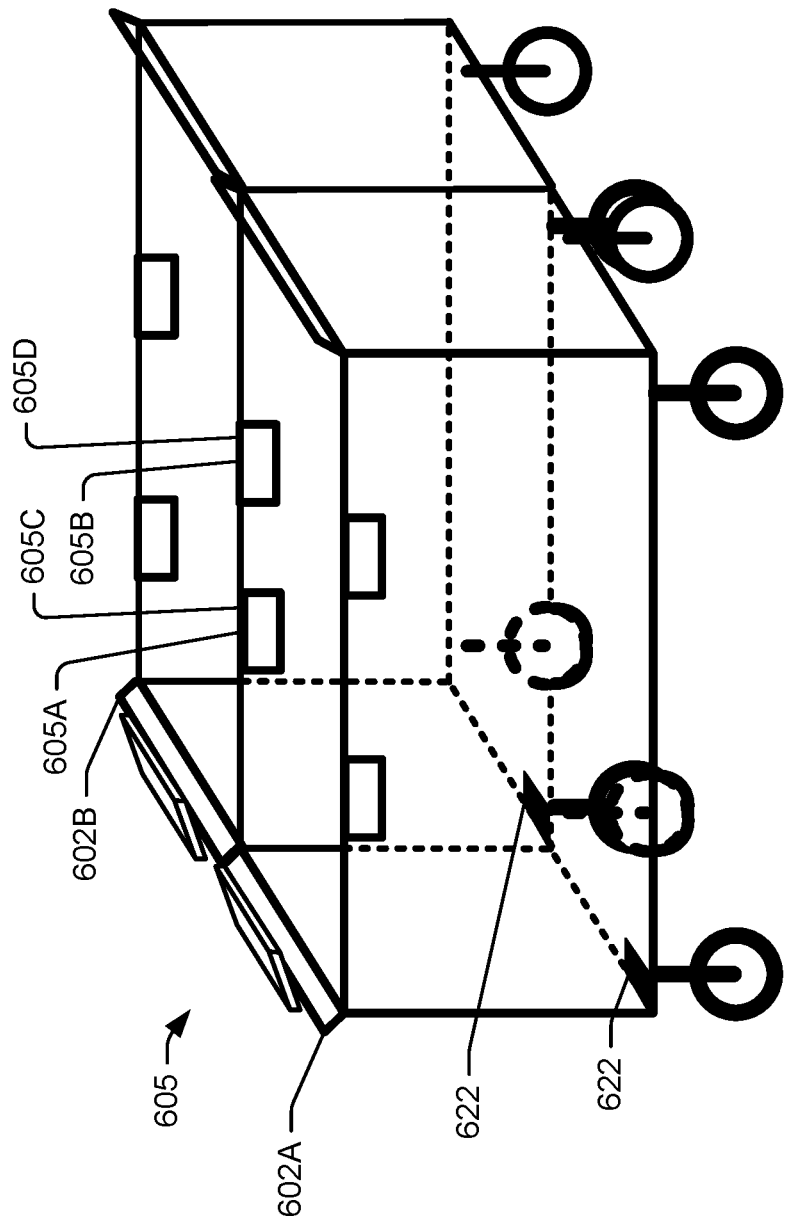
FIG. 6 illustrates an example connected tote configuration, according to some implementations.

FIG. 6 is a block diagram providing an example of two connected totes. As discussed above, each tote may include one or more connection points 605. The connection points 605 may be latches, magnets, clasps, hooks, etc., that are configured to engage with connection points 605 of other totes. For example, connection points 605A, 605B of tote 602A may include male connectors that are configured to engage with corresponding female connectors 605C, 605D of tote 602B when the two totes are connected, as illustrated in FIG. 6.

Figure 7:
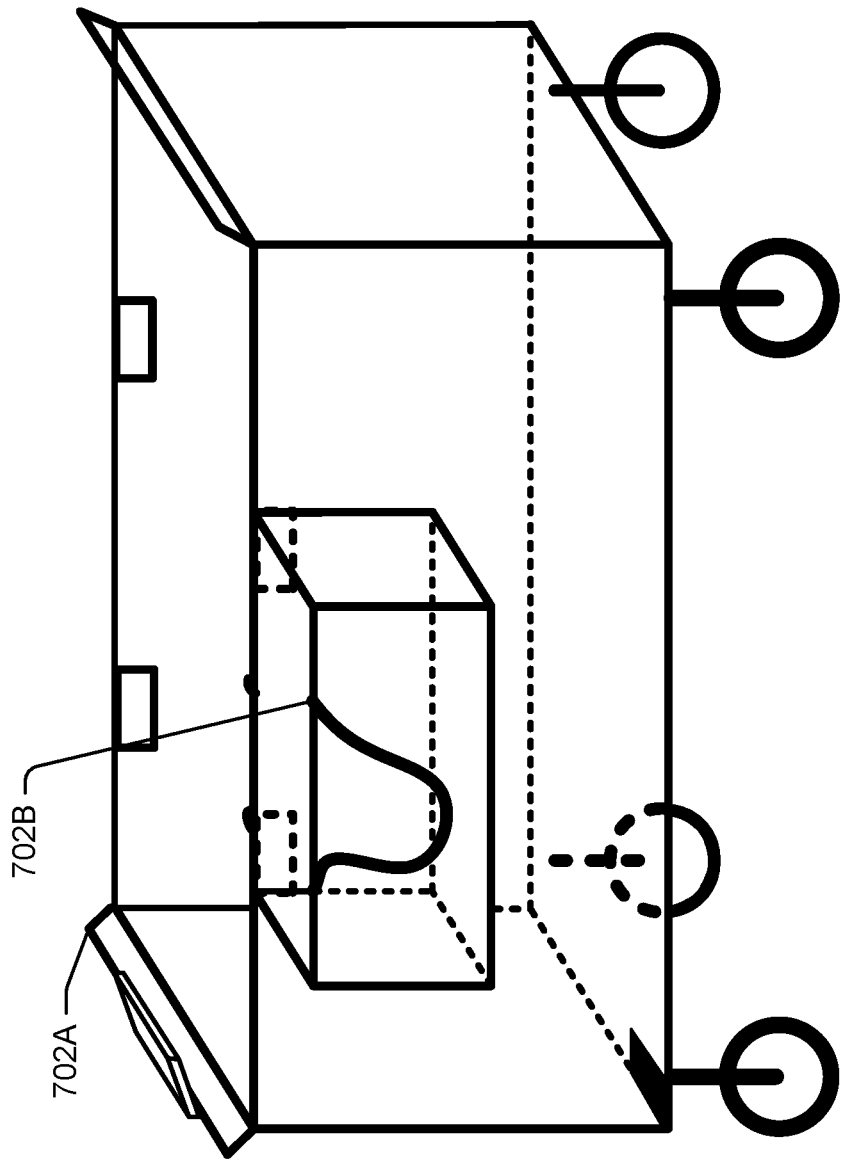
FIG. 7 illustrates an example connected tote configuration, according to some implementations.

The connection points 605 may provide physical and/or electrical connection. For example, in addition to physically connecting two totes, the connection points 605 may provide electrical connectivity between the functional components 622 of the two totes enabling exchange of data, sharing and/or combination of processing capabilities, shared memory usage, shared power, shared used of sensors, shared connectivity, shared cameras for detecting items, and the like. In some implementations, when two or more totes are connected, the connection between the connection points 602, 605 may be used to determine the connection of the totes and allow the totes to exchange information (e.g., unique tote identifiers). Likewise, one of the totes, such as tote 602A, may be designated as a master tote such that all processing is performed by that tote. Master tote determination may be randomly done. For example, regardless of the tote into which an item is placed, the detected item addition is provided to the processing components of the master tote 602A. The master tote likewise is responsible for communication with the inventory management system 150. In some implementations, components may be shared between connected totes to improve item identification and/or functionality of the totes. For example, referring briefly to FIG. 7, the carry tote 702B may not typically include sensors or cameras for detecting the pick and/or place of items. When connected with the wheeled tote 702A, the sensors and/or cameras of the wheeled tote may be used to detect the pick and/or place of items into either the wheeled tote 702A or the carry tote 702B FIG. 7 is another block diagram of a set of connected totes. In this example, a wheeled tote 702A is connected with a non-wheeled or carry tote 702B. As with the other examples, when items are placed in either tote 702A, 702B, they are included on a profile item identifier list that identifies all items included in all totes currently associated with the profile. Likewise, items placed in either tote 702A, 702B may be added to a single tote item identifier list. In both examples illustrated in FIGS. 6 and 7, the set of connected totes may be treated as a single tote while connected. Treating connected totes as a single tote includes a tote item identifier list for the connected totes that identifies items included in all physically connected totes. If the totes are separated, the tote item identifier list may likewise be separated and separate tote item identifier lists established for each tote that includes the items contained in the respective tote. In such an example, the profile item identifier list would continue to maintain the list of all items associated with the profile.

Figure 8:
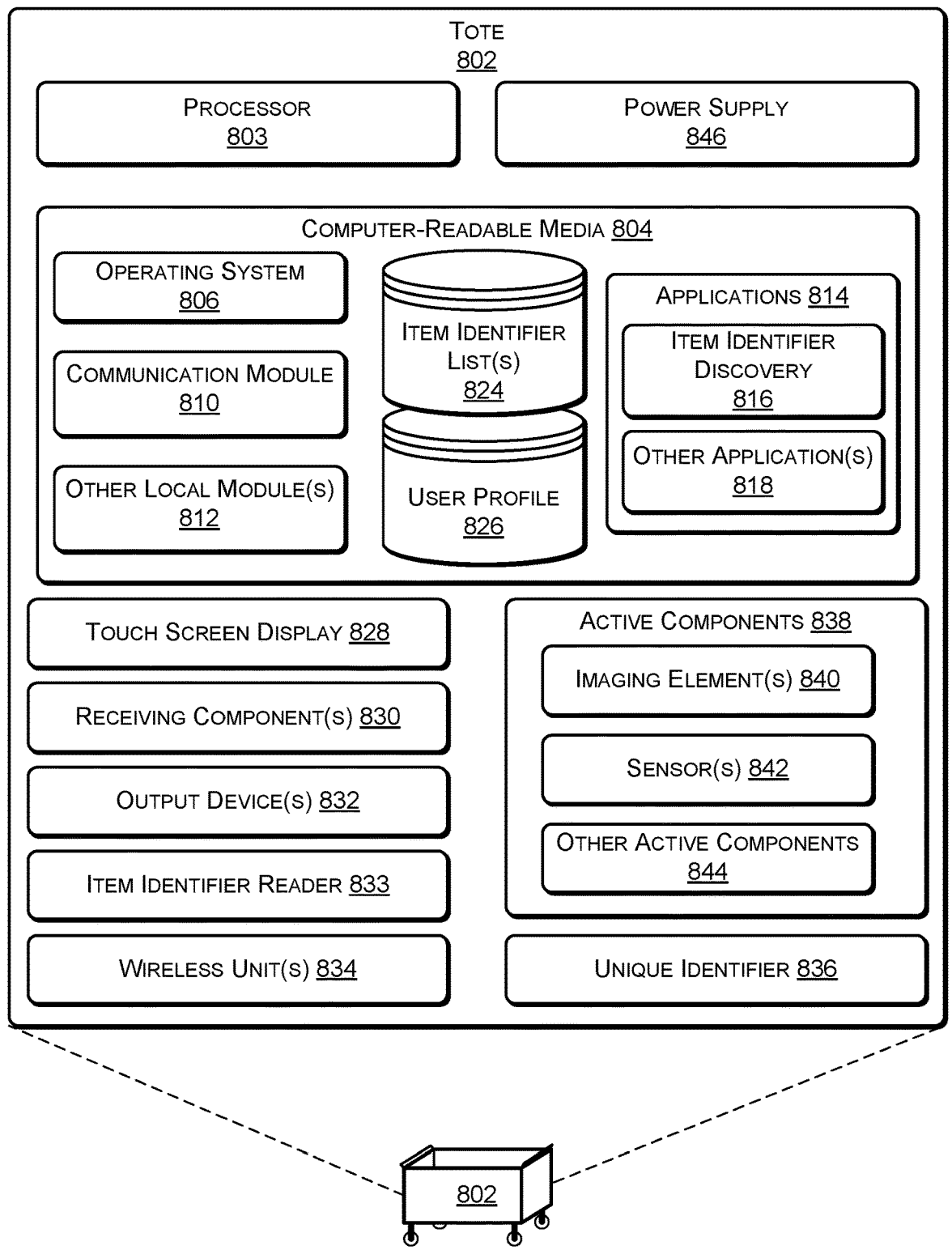
FIG. 8 illustrates example functional components of a tote, such as those illustrated in FIGS. 3A-7, according to some implementations.

FIG. 8 illustrates example functional components of a tote 802, such as those illustrated in FIGS. 3A-7, according to some implementations. The functional components of the tote 802 include one or more processors 803 and computer-readable media 804. The computer-readable media 804 may include volatile and nonvolatile memory, removable and non-removable media implemented in any method or technology for storage of information, such as computer-readable instructions, data structures, program modules, tote item inventor lists, user profiles, or other data. Such memory includes, but is not limited to, RAM, ROM, EEPROM, flash memory or other memory technology. The computer-readable media 804 may be implemented as computer-readable storage media ("CRSM"), which may be any available physical media accessible by the processor(s) 802 to execute instructions stored on the media 804. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 803.

Several modules such as instruction, data stores, and so forth may be stored within the computer-readable media 804 and configured to execute on the processor(s) 803. A few example functional modules are shown stored in the computer-readable media 804, although the same functionality may alternatively be implemented in hardware, firmware, or as a system on a chip (SOC).

An operating system module 806 may be configured to manage hardware and services within and coupled to the tote 802 for the benefit of other modules. A communication module 810 facilitates communication, such as cellular communication, RF communication, Wi-Fi communication, Bluetooth communication, NFC, satellite-based communication, and so forth. For example, the communication module 810 may facilitate communication with the inventory management system 150 and/or other totes via the network, or over another wired and/or wireless communication path. Likewise, the communication module 810 may facilitate communication and detection of item identifiers. Other local modules 812 may also be present on the tote 802, depending upon the implementation and configuration of the tote 802.

The tote 802 may also include a plurality of applications 814 stored in the computer-readable media 804 or otherwise accessible to the tote 802. In this implementation, the applications 814 include an item identifier discovery application 816 and other applications 818. However, the tote 802 may include any number or type of applications and is not limited to the specific example shown here. The item identifier discovery application 816 may facilitate item identifier discovery as items are added to and/or removed from the tote 802. Data stores may also be stored locally on the media 804, including an item identifier list data store 824 and one or more user profiles 826 of users that have interacted with and/or use the tote 802. The item identifier list data store 824 may include a tote item identifier list identifying items that have been detected as present within the cavity of the tote 802 and/or a count of a number of times each item identifier 802 has been detected. The item identifier list data store 824 may also maintain a profile item identifier list identifying items that have been detected and associated with a profile that is also associated with the tote.

The user profile(s) data store 826 may include user characteristics, preferences, pick lists, usage history, purchase history, and other information specific to an individual user.

The tote 802 may also include a display, such as a touch screen display 828, as well as other input devices, like a keypad, control buttons, microphones, motion detection components, etc. Output devices 832 may include a display, an illumination element (e.g., LED), a vibrator to create haptic sensations, microphone(s) or the like. The tote 802 might further include an item identifier reader 833, such as an RFID reader that couples to a receiving component 830 to facilitate detection of item identifiers. Likewise, the tote 802 might include a wireless unit 834 coupled to another antenna to facilitate a wireless connection to one or more networks. The wireless unit 834 may implement one or more of various wireless technologies, such as Wi-Fi, Bluetooth, RF, and so on.

The tote 802 may also include an embedded unique identifier 836. The unique identifier may be embedded into a memory 804 or otherwise stored and accessible by the tote 802.

The tote 802 may also be equipped with multiple active components 838. Any number of components may be used. Representative components include imaging elements 840, sensors 842 and other active components 844. The tote 802 may also include some form of power supply 846, such as a battery, solar power, or other form of power supply for providing power to the tote 802 and its components during operation.

While the functional components of the example tote 802 are discussed herein as part of the tote 802, in other implementations, one or more of the functional components may be distributed throughout the materials handling facility 100 and/or implemented as part of the inventory management system 150. For example, one or more of the applications, such as the item identifier discovery application 816, may be implemented as part of the inventory management system 150. In such an example, when the item identifier reader 833 detects an item identifier, it may be provided directly to the inventory management system 150 and the inventory management system may discover the item and add the item identifier to the tote item identifier list and/or the profile item identifier list. Likewise, the tote item identifier list and/or the profile item identifier list may be maintained in the computer-readable media 804 of the tote 802 and/or in the item identifier list data store 218 of the inventory management system 150.

Figure 9:
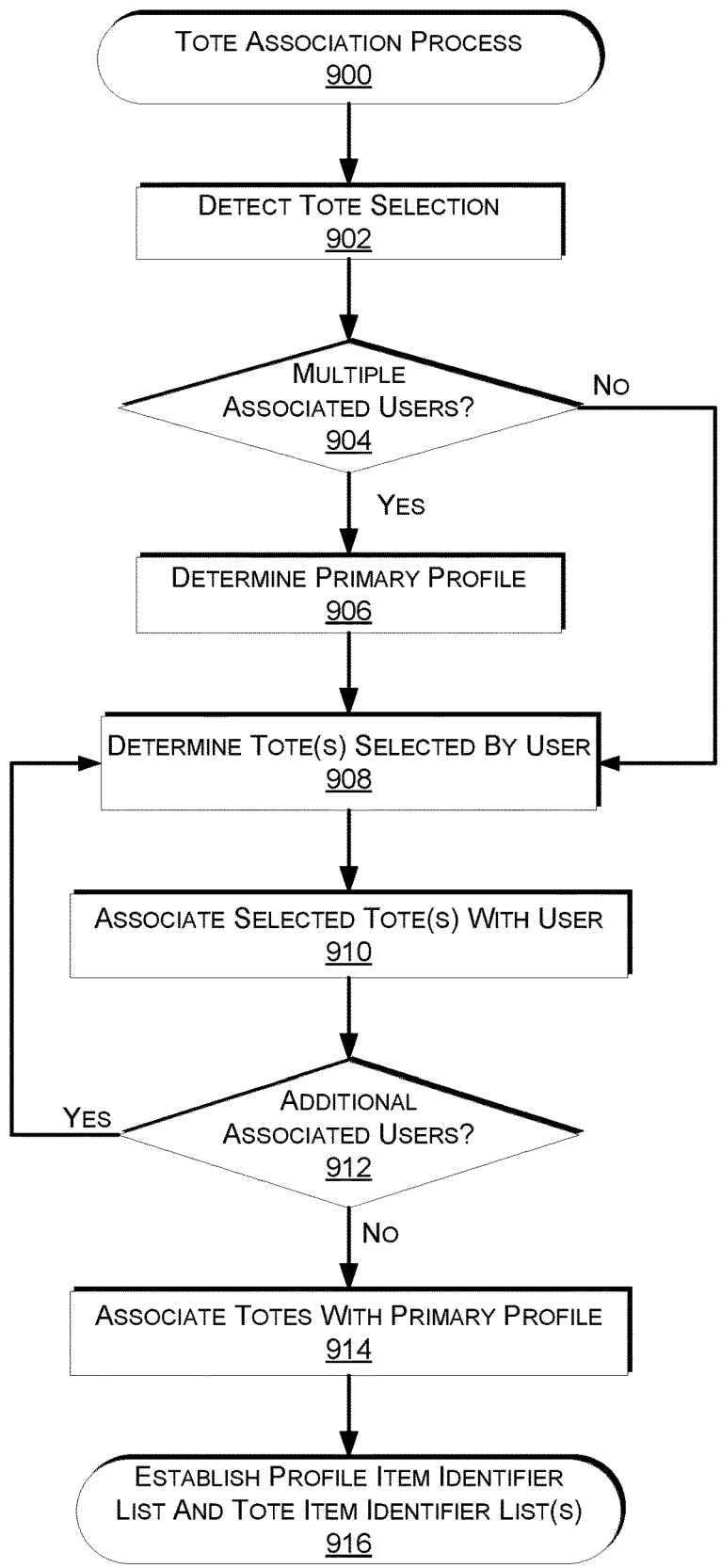
FIG. 9 depicts a flow diagram of a tote association process, according to some implementations.

FIG. 9 depicts a flow diagram of an example tote association process 900, according to some implementations. The example process 900 may be implemented with any of the tote configurations discussed above. The process of FIG. 9 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 900 begins by detecting a selection of one or more totes, as in 902. For example, if a user selects a tote(s) from a tote storage area, selects an unused tote etc., the tote selection is detected. For example, one or more images of a user selecting totes may be captured and processed to identify the user and the selected tote(s). In another implementation, totes may be issued to a user from a tote storage area and/or removed by the user from the storage area. As the tote(s) is exiting the storage area, the unique identifier of the tote(s) is detected.

A determination is also made as to whether there are multiple associated users that have selected the one or more totes, as in 904. Users may be associated by the users identifying themselves as associated and/or by the inventory management system associating the users. For example, the inventory management system may associate two users for picking of an order for a large number of items that are to be consolidated or otherwise treated together.

If there are multiple associated users, a primary profile is selected or established, as in 906. For example, one of the users may be identified as a primary user and the user profile for that user may be determined to be the primary profile. In other implementations, the users may identify a primary profile. In still other implementations, the inventory management system may randomly select a primary profile.

Upon selection of a primary profile or if there is only one user (that user's profile is by default considered the primary profile), totes selected by a user are determined, as in 908. As discussed above, multiple totes may be selected by one or many associated users. For example, as a user removes totes from the tote storage area, it may be determined that the user is selecting multiple totes. Likewise, if the user couples two or more totes together, it may be determined that the user has selected multiple totes. Each tote selected by a user is associated with that user, as in 910. Likewise, if the totes are coupled together, the totes are associated with each other and are effectively treated as a single tote. In some instances, a user may not select any totes. For example, if there are two associated users, they may only select a single tote. In such an example, both users are associated with the same primary profile and the same tote.

A determination is then made as to whether there are additional associated users, as in 912. If there are additional associated users, the example process 900 returns to block 908 and continues. However, if there are no additional users, the determined totes are associated with the primary profile, as in 914. In addition to associating the totes with the primary profile, a profile item identifier list is established along with one or more tote item identifier lists, as in 916. As discussed above, the profile item identifier list is configured to identify all items included in any of the determined totes associated with the primary profile. The tote item identifier list is configured to identify all items of a particular tote or group of connected totes. For example, if a first user coupled two totes, the tote item identifier list would identify items included in either of the coupled totes. In comparison, if a second user only selected one tote, the tote item identifier list will identify items for that one selected tote.

Figure 10:
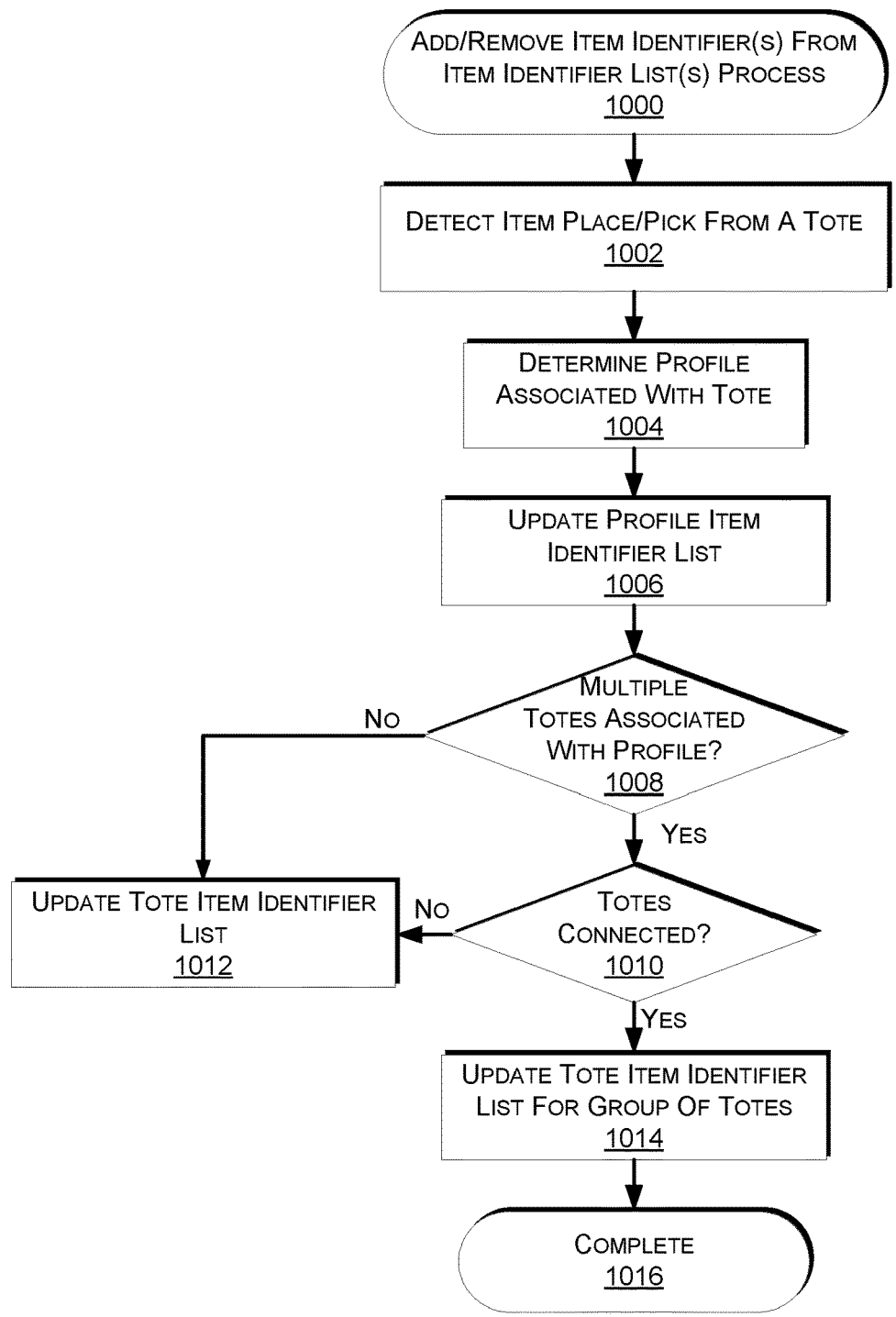
FIG. 10 depicts a flow diagram of a process for updating item identifier lists in response to a place or a pick of an item into or out of a tote, according to some implementations.

FIG. 10 is a block diagram of a process for adding item identifiers to item identifier lists and/or removing item identifiers from item identifier lists, according to some implementations. The example process 1000 begins by detecting an item place of an item into a tote or an item pick removing an item from a tote, as in 1002. As discussed above, an item pick from a tote and/or an item place into a tote can be detected using, for example, RFID scanners, load cells, image capture devices, etc. Upon detecting an item place/pick from a tote, a profile associated with the tote is determined, as in 1004. For example, the unique identifier of the tote may be detected or reported with an item place/pick notification. For example, if a tote detects an item place into the tote, the tote may provide an item place notification to the inventory management system. The item place notification may include an item identifier representative of the detected placed item, a quantity of the items placed, a unique identifier of the tote, etc.

The profile item identifier list for the determined profile is then updated to identify the placed item and/or remove the item identifier corresponding to the removed item, as in 1006. For example, if an item pick from a tote is determined, the item identifier representative of the picked item is removed from the profile item identifier list. Similarly, if an item place into a tote is determined, an item identifier representative of the placed item is added to the profile item identifier list.

Updating the profile item identifier list may also include sending the profile item identifier list for presentation to the user(s) associated with the profile. For example, the profile item identifier list may be sent to a display of each tote associated with the profile. Alternatively, or in addition thereto, the profile item identifier list may be sent to a user's device, such as a tablet, phone, laptop, etc., and/or sent to an output device (e.g., display, projector) located within the materials handling facility.

A determination is also made as to whether there are multiple totes associated with the determined profile, as in 1008. If it is determined that there are multiple totes associated with the profile, a determination is made as to whether the tote from which the item place/pick was detected is coupled with one or more other totes, as in 1010. As discussed above, a tote item identifier list is maintained for each tote or each group of coupled totes.

If it is determined that the tote is not connected with any other totes, or if there are not multiple totes, the tote item identifier list associated with the tote is updated, as in 1012. Similar to updating the profile item identifier list, if an item is placed into the tote, the tote item identifier list is updated to include an item identifier representative of the item added to the tote. If an item is picked from the tote, the tote item identifier list is updated to remove the corresponding item identifier from the tote item identifier list. Likewise, the tote item identifier list may be sent for display to the user associated with the tote. For example, the tote item identifier list may be sent for display on a display coupled to the tote, sent to a user device and/or sent to an output device located within the materials handling facility.

If it is determined that the tote is connected with one or more other totes, the tote item identifier list for the connected group of totes is updated, as in 1014. As discussed above, a single tote item identifier list is maintained for connected totes so that the connected totes are effectively treated as a single tote while they are connected. In such an example, the tote item identifier list may be sent for display to only a display of a master tote or to all displays of connected totes. Similarly, the tote item identifier list may be sent to a user device of the user associated with the tote and/or an output device located within the materials handling facility.

After updating the tote item identifier list for a single tote or after updating the tote item identifier list for a group of connected totes, the example process 1000 completes, as in 1016.

Providing the profile item identifier list to all totes and users associated with the profile and providing tote item identifier lists for each tote (or group of coupled totes) and corresponding user(s) allows users to see both, all items picked as part of the profile as well as items picked and located in that user's tote or group of coupled totes. Providing a profile item identifier list to all users reduces the likelihood that multiple users will pick the same item as they can see whether another associated user has already picked the item.

Figure 11:
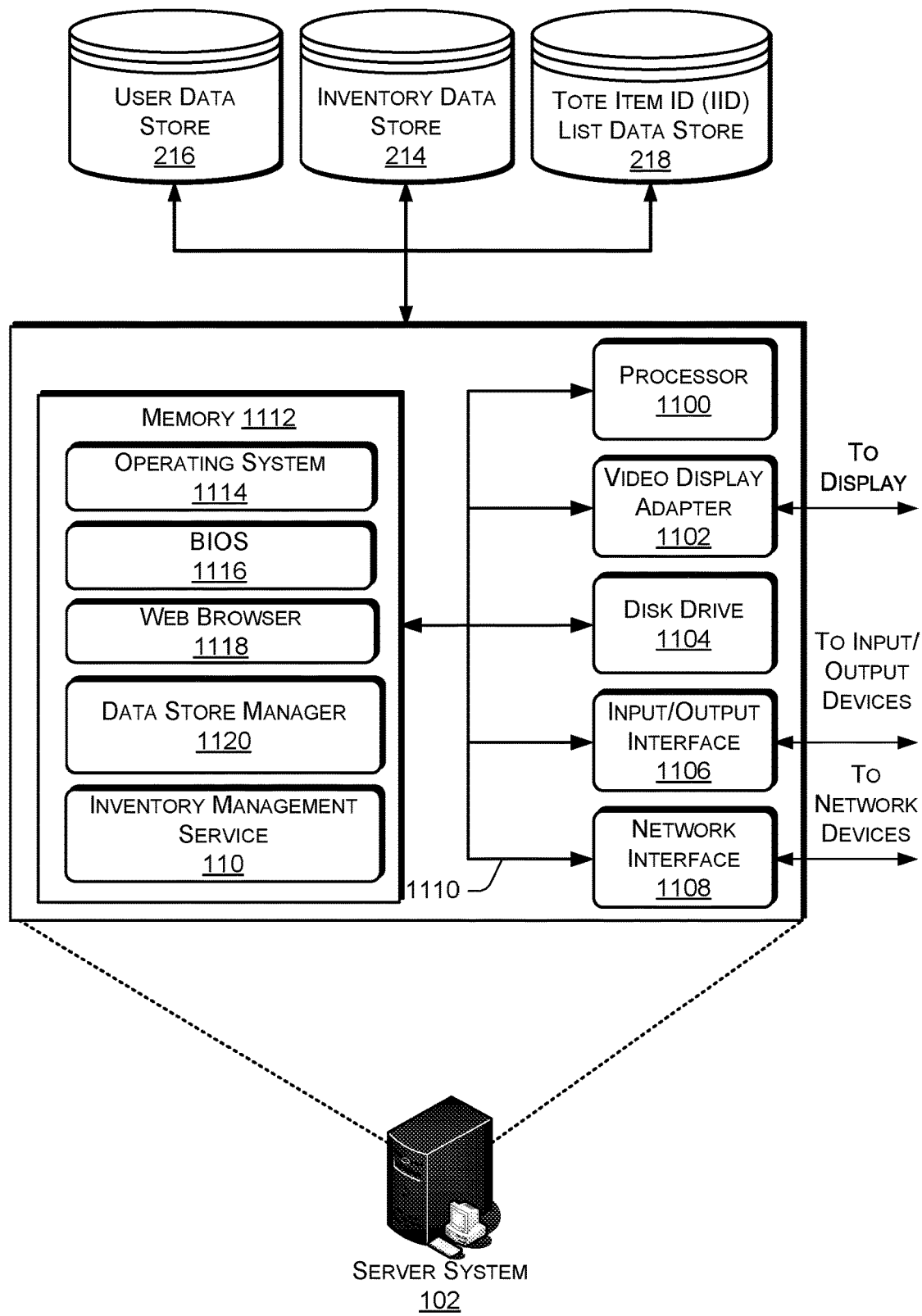
FIG. 11 is a block diagram of an illustrative implementation of a server system that may be used with various implementations.

FIG. 11 is a pictorial diagram of an illustrative implementation of a server system, such as the server system 102, that may be used in the implementations described herein. The server system 102 may include a processor 1100, such as one or more redundant processors, a video display adapter 1102, a disk drive 1104, an input/output interface 1106, a network interface 1108, and a memory 1112. The processor 1100, the video display adapter 1102, the disk drive 1104, the input/output interface 1106, the network interface 1108, and the memory 1112 may be communicatively coupled to each other by a communication bus 1110.

The video display adapter 1102 provides display signals to a local display (not shown in FIG. 11) permitting an operator of the server system 102 to monitor and configure operation of the server system. The input/output interface 1106 likewise communicates with external input/output devices not shown in FIG. 11, such as a mouse, keyboard, scanner, or other input and output devices that can be operated by an operator of the server system 102. The network interface 1108 includes hardware, software, or any combination thereof, to communicate with other computing devices. For example, the network interface 1108 may be configured to provide communications between the server system 102 and other computing devices, such as totes, via a network.

The memory 1112 generally comprises random access memory (RAM), read-only memory (ROM), flash memory, and/or other volatile or permanent memory. The memory 1112 is shown storing an operating system 1114 for controlling the operation of the server system 102. A binary input/output system (BIOS) 1116 for controlling the low-level operation of the server system 102 is also stored in the memory 1112.

The memory 1112 additionally stores program code and data for providing network services to totes and/or the inventory management system 150. Accordingly, the memory 1112 may store a browser application 1118. The browser application 1118 comprises computer executable instructions, that, when executed by the processor 1100, generate or otherwise obtain configurable markup documents such as Web pages. The browser application 1118 communicates with a data store manager application 1120 to facilitate data exchange between the inventory data store 214, the user profile data store 216, and/or the item identifier list data store 218.

As used herein, the term "data store" refers to any device or combination of devices capable of storing, accessing and retrieving data, which may include any combination and number of data servers, databases, data storage devices and data storage media, in any standard, distributed or clustered environment. The server system 102 can include any appropriate hardware and software for integrating with the data stores 214-218 as needed to execute aspects of one or more applications for the tote 202, and/or the inventory management system 150.

The data stores 214-218 can include several separate data tables, databases or other data storage mechanisms and media for storing data relating to a particular aspect. For example, the data stores 214-218 illustrated include mechanisms for inventory information, user information, tote item identifier lists, tote information, etc., which can be used to generate and deliver information to totes 202, the inventory management system 150 and/or users.

It should be understood that there can be many other aspects that may be stored in the data stores 214-218. The data stores 214-218 are operable, through logic associated therewith, to receive instructions from the server system 102 and obtain, update or otherwise process data in response thereto.

In addition to maintaining information about inventory, users, and totes, the inventory management system 150 may provide use information back to the users. For example, the inventory management system 150, through communication between the server system 102 and a tote, may provide use information back to a user. Such information may include a list of the items included in the tote, the cost of items included in the tote, items remaining to be picked before the tote is to progress to the transition area, the location within the materials handling facility of items to be picked, and the like.

The memory 1112 may also include the inventory management system 150, discussed above. The inventory management system 150 may be executable by the processor 1100 to implement one or more of the functions of the server system 102. In one implementation, the inventory management system 150 may represent instructions embodied in one or more software programs stored in the memory 1112. In another implementation, the inventory management system 150 can represent hardware, software instructions, or a combination thereof.

The server system 102, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
    under control of one or more computing systems configured with executable instructions, determining a first user as the first user enters a materials handling facility;
    associating the first user with a profile item identifier list;
    determining a second user as the second user enters the materials handling facility;
    associating the second user with the profile item identifier list;
    adding a first item identifier corresponding to a first item picked by the first user to the profile item identifier list;
    adding a second item identifier corresponding to a second item picked by the second user to the profile item identifier list; and
    subsequent to adding the first item identifier and the second item identifier to the profile item identifier list, transitioning the first item and the second item from the materials handling facility to the first user.

2. The computer-implemented method of claim 1, further comprising:
    receiving, from at least one of the first user or the second user, an indication that the second user is to be associated with the profile item identifier list.

3. The computer-implemented method of claim 1, further comprising:
    determining a purchase of the first item and the second item; and
    wherein transitioning the first item and the second item is in response to the purchase.

4. The computer-implemented method of claim 1, further comprising:
    determining a selection of a first tote by the first user; and
    associating the first tote with the profile item identifier list.

5. The computer-implemented method of claim 1, further comprising:
    associating a tote with the profile item identifier list;
    determining an item pick of a third item from the tote, wherein the third item was previously placed into the tote and a corresponding third item identifier added to the profile item identifier list prior to determining the item pick of the third item from the tote; and
    in response to determining the item pick of the third item from the tote:
        updating the profile item identifier list to remove the corresponding third item identifier; and
        sending for presentation an indication that the corresponding third item identifier has been removed from the profile item identifier list.

6. A computing system, comprising:
    one or more processors; and a memory coupled to the one or more processors and storing program instructions that, when executed by the one or more processors, cause the one or more processors to at least:
  determine a first user in a materials handling facility;
  associate the first user with a profile item identifier list;
  determine a second user in the materials handling facility;
  associate the second user with the profile item identifier list;
  for each item picked from any of a plurality of inventory locations within the materials handling facility by the first user or the second user, add a corresponding item identifier for the picked item to the profile item identifier list;
  for each item placed to any of the plurality of inventory locations by either the first user or the second user, remove the corresponding item identifier from the profile item identifier list;
  determine that the items indicated on the profile item identifier list by the corresponding item identifier are being purchased; and
  in response to determination that the items are being purchased, cause a transition of the items to the first user.

7. The computing system of claim 6, wherein the program instructions that, when executed by the one or more processors, further cause the one or more processors to at least:
  receive an indication that the second user is to be associated with the profile item identifier list; and
  association of the second user with the profile item identifier list is in response to the indication.

8. The computing system of claim 6, wherein the program instructions that, when executed by the one or more processors, further cause the one or more processors to at least:
  determine the profile item identifier list associated with the first user.

9. The computing system of claim 6, wherein association of the second user with the profile item identifier list is for a defined duration while the first user and the second user are located at the materials handling facility.

10. The computing system of claim 6, wherein association of the second user with the profile item identifier list is a permanent association.

11. The computing system of claim 6, wherein the program instructions that, when executed by the one or more processors, further cause the one or more processors to at least:
  determine a tote picked by the first user or the second user; and
  associate the tote, the first user, and the second user with the profile item identifier list.

12. The computing system of claim 11, wherein the program instructions that, when executed by the one or more processors to determine the tote, further include program instructions that, when executed by the one or more processors, further cause the one or more processors to at least:
  determine based at least in part on one or more of a first image that includes a first representation of the first user selecting the tote, a second image that includes a second representation of the second user selecting the tote, the tote being issued to the first user, the tote being issued to the second user, the tote being removed from a tote storage area, or a unique identifier associated with the tote.

13. The computer system of claim 11, wherein the program instructions that, when executed by the one or more processors, further cause the one or more processors to at least:
  determine an item pick of a first item from the tote, wherein the first item was previously placed into the tote and a corresponding first item identifier added to the profile item identifier list prior to determination of the item pick of the first item from the tote; and
  in response to determination of the item pick of the first item from the tote, update the profile item identifier list to remove the corresponding first item identifier.

14. The computing system of claim 6, wherein the program instructions that, when executed by the one or more processors, further cause the one or more processors to at least:
  for each item picked by the first user or the second user, send, for presentation to at least one of the first user or the second user, an indication that an item identifier corresponding to the picked item has been added to the profile item identifier list.

15. A method, comprising:
  associating a plurality of users with a profile item identifier list;
  for each item picked from any of a plurality of inventory locations within a materials handling facility by any of the plurality of users, adding a corresponding item identifier for the picked item to the profile item identifier list; and
  causing a transition of each item indicated by the corresponding item identifiers added to the profile item identifier list from the materials handling facility to at least one of the plurality of users.

16. The method of claim 15, further comprising:
  for each item placed to any of the plurality of inventory locations by any of the plurality of users, removing the corresponding item identifier from the profile item identifier list.

17. The method of claim 15, further comprising:
  receiving, from a first user of the plurality of users, an indication that each of the plurality of users are to be associated with the profile item identifier list; and
  wherein associating the plurality of users with the profile item identifier list is in response to receiving the indication.

18. The method of claim 15, wherein the association of the plurality of users with the profile item identifier list is temporary.

19. The method of claim 15, further comprising:
  sending, for presentation to at least one of the plurality of users, an indication of the corresponding item identifiers added to the profile item identifier list.

20. The method of claim 15, further comprising:
  determining that each item indicated on the profile item identifier list by the corresponding item identifier is being purchased; and
  wherein causing the transition of each item is in response to determining that each item is being purchased.

* * * * *